May 28, 1935.　　　A. W. SCHOOF　　　2,002,679
APPARATUS FOR GAUGING AND ADJUSTING ARTICLES
Filed June 23, 1931　　2 Sheets-Sheet 1
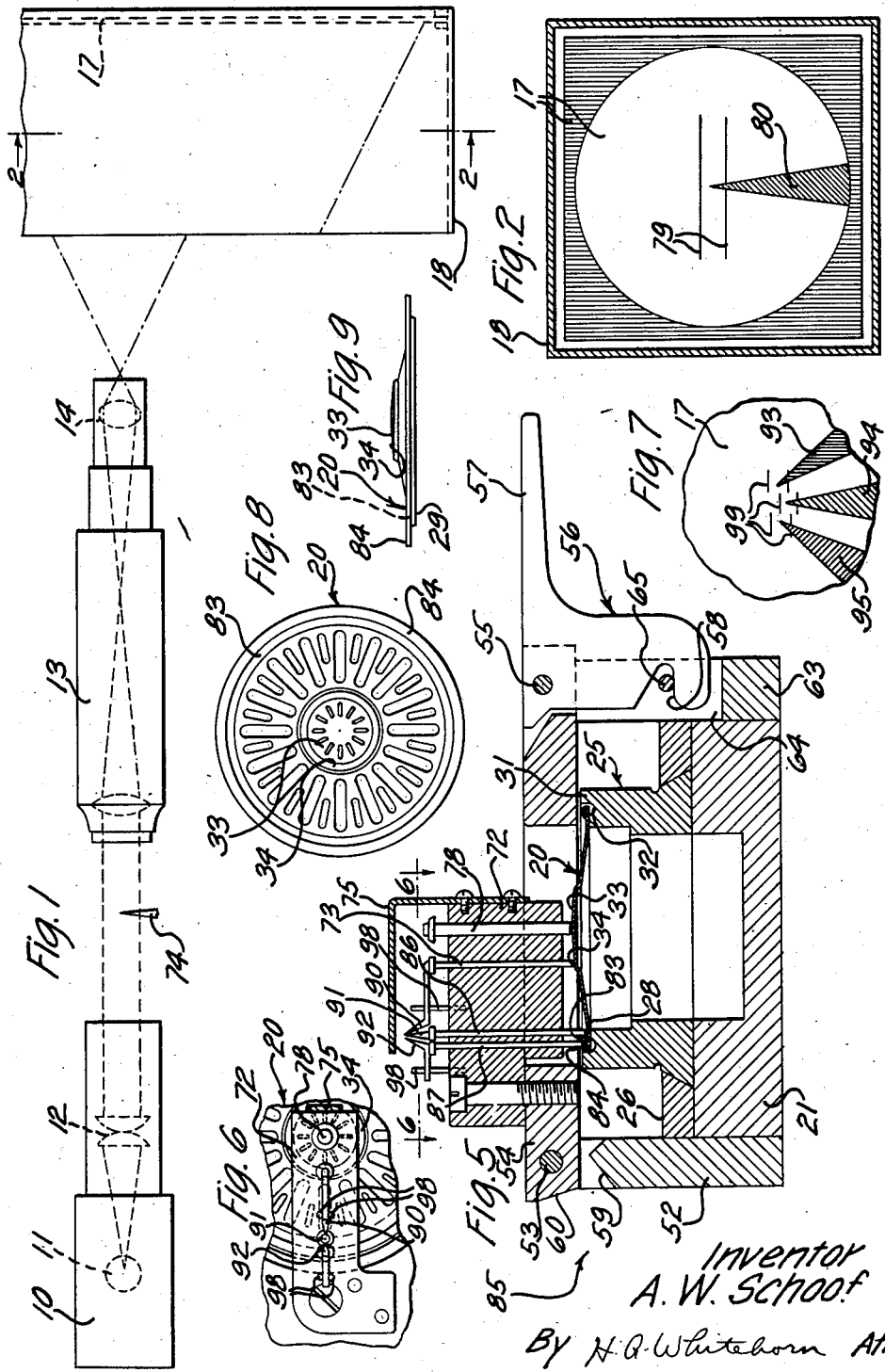
Inventor
A. W. Schoof
By H. Q. Whitehorn Atty

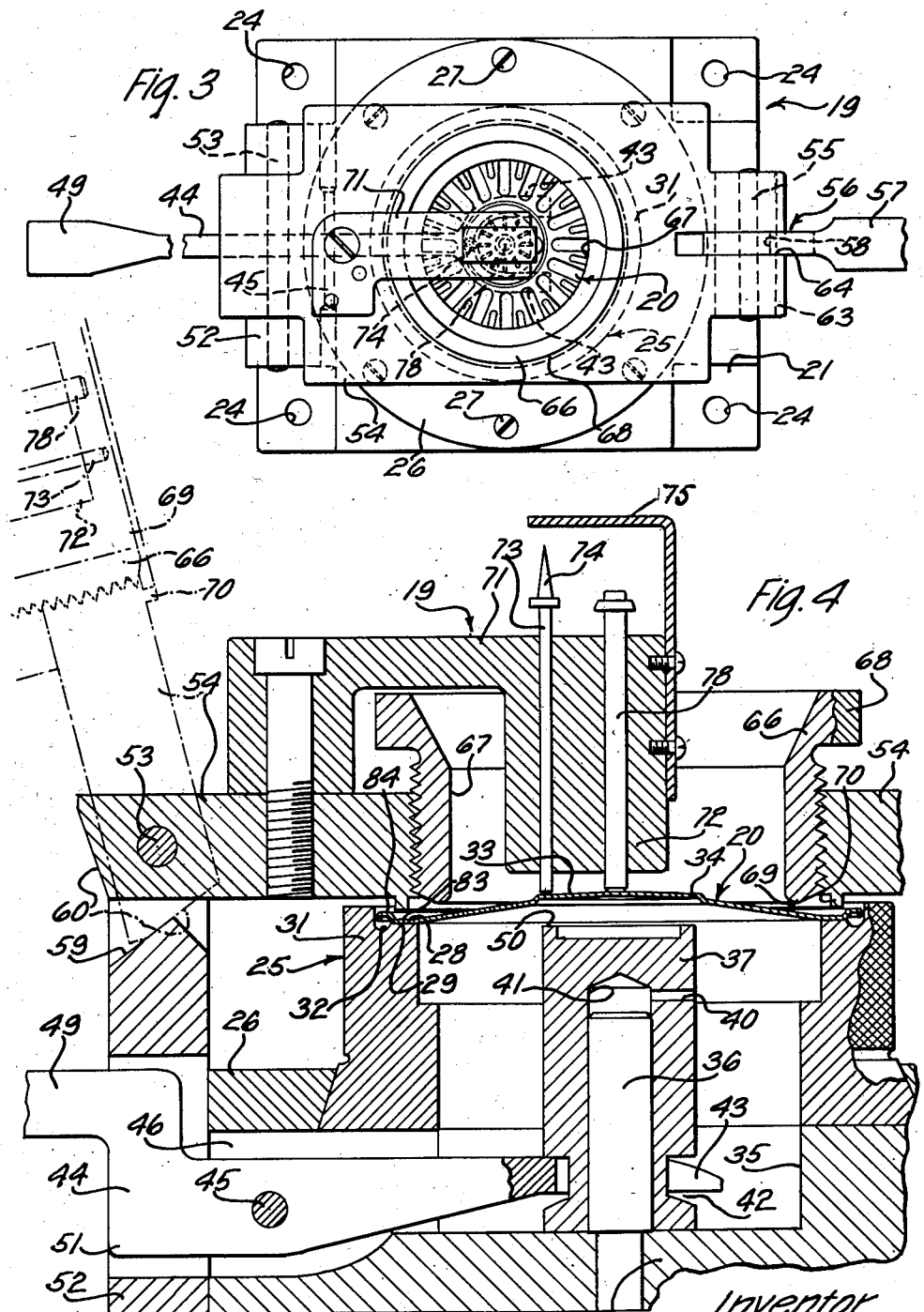

Patented May 28, 1935

2,002,679

UNITED STATES PATENT OFFICE 2,002,679

APPARATUS FOR GAUGING AND ADJUSTING ARTICLES

Arthur W. Schoof, Riverside, Ill., assignor to Western Electric Company, Incorporated, New York, N. Y., a corporation of New York Application June 23, 1931, Serial No. 546,229

9 Claims. (Cl. 33—174)

This invention relates to apparatus for gauging and adjusting articles, and more particularly to apparatus involving optical systems for determining the dimensions of and adjusting articles to predetermined dimensions.

Diaphragms such as are used in sound transmitting instruments are sometimes formed from thin ductile metal and in order to function properly it is necessary that the seating portions or surfaces which are disposed concentrically in different planes be parallel and predeterminedly spaced from each other.

The primary object of this invention is to provide an improved apparatus for accurately gauging articles and preferably also adjusting them to predetermined dimensions.

In accordance with the general features of this invention in one embodiment thereof as applied to the gauging and adjusting to predetermined dimensions of articles, such as metal diaphragms of the type hereinbefore referred to, an apparatus is provided which includes means for rotatably supporting a diaphragm upon one of its seating surfaces, the diaphragm being engaged upon another of its seating surfaces with a gauge indicator which is freely slidable in a hinged arm, the indicator being movable by its own weight into engagement with the seating surface in one position of the arm. The indicator extends from the seating surface and into the path of a beam of light of an optical projector of the magnifying type. The magnified image of the free end of the indicator is projected onto a screen provided with calibrations indicating tolerance limits for parallelism of and the space between the seating surfaces and during one revolution of the support a lack of parallelism between the seating surfaces is indicated by a movement of the image and if it moves outside the tolerance limits the diaphragm is considered defective unless its lack of parallelism or spacing should be corrected in a subsequent adjustment of the diaphragm. If the image stands still or moves only between the tolerance limits during the rotation of the diaphragm the surfaces are considered to be sufficiently parallel and at the same time it is also indicated that the space between the surfaces is within the tolerance limits. The diaphragm is manipulated or adjusted by pressing thereon in opposite directions by cooperating movable means arranged at opposite sides of the diaphragm until the space between the seating surfaces is within the tolerance limits as indicated by the image upon the screen.

Other objects and advantages of this invention will more fully appear from the following detailed description taken in connection with the accompanying drawings, in which Fig. 1 is a diagrammatic fragmentary side view of an optical system and indicator of one form of an apparatus embodying the features of this invention as applied to the gauging and adjusting of diaphragms used in sound transmitting instruments;

Fig. 2 is a vertical section on a reduced scale taken on the line 2—2 of Fig. 1 showing the screen with the calibrated tolerance limits and the magnified image of the indicator of the apparatus;

Fig. 3 is a fragmentary plan view of the diaphragm gauging and adjusting apparatus shown in position for gauging a diaphram;

Fig. 4 is an enlarged fragmentary vertical detail sectional view of Fig. 3 with the apparatus shown in position for gauging a diaphragm;

Fig. 5 is a fragmentary vertical detail sectional view of another embodiment of a gauging apparatus without the adjusting feature;

Fig. 6 is a fragmentary plan view taken on the line 6—6 of Fig. 5;

Fig. 7 is a fragmentary view of a screen with one form of calibrated tolerance limits and the magnified image of the indicators of the gauging apparatus shown in Fig. 5;

Fig. 8 is a plan view on a reduced scale of the diaphragm shown in section in Fig. 4, and Fig. 9 is a side view thereof.

Referring now to the drawings, and particularly to Fig. 1, which diagrammatically illustrates the optical system, a housing 10 contains a lamp 11 for emitting a light beam of high intensity. The light beam passes from the housing 10 through condensing lenses 12, a beam passing from the lenses and through a projector 13 having a plurality of lenses 14 for projecting a magnified image, to be presently described, upon a screen 17 mounted in a housing 18 adapted to shield the screen from external direct lighting so that the projected image will be clearly revealed upon the screen. The screen 17 may be of ground glass or other suitable material.

The optical system may be mounted on a supporting member (not shown) and in the particular application thereof may be arranged as a bench type apparatus, although in the drawings, it is shown in diagrammatic form for the sake of simplicity. Also mounted on the supporting member between the lenses 12 and 14 is a fixture 19 (Figs. 3 and 4) upon which the article, in the present application of the invention a diaphragm 20 (Figs. 7 and 8), for use in sound transmitting instruments, is supported during the gauging and adjusting operations thereof. The fixture 19, referring to Figs. 3 and 4, comprises a base member 21, which may be secured in a fixed position upon the supporting member by fastening means (not shown) projecting through apertures 24 in the base member (Fig. 3). Rotatably mounted upon the upper surface of the member 21 is a ring 25 (Figs. 3 and 4) retained in position thereon by cooperating outer and inner annularly disposed peripheral surfaces of the ring 25 and a surrounding ring 26, respectively, the latter being secured to the upper surface of the member 21 by screws 27 (Fig. 3). The upper surface of the ring 25 is provided with a continuous annular surface 28 (Fig. 4) for supporting the diaphragm 20 which rests upon an outer annular seating portion or surface 29 provided on one side thereof adjacent its periphery in a predetermined vertical plane with respect to calibrated tolerance limits provided on the screen 17. The surface 29 is the surface with respect to which other surfaces of the diaphragm, to be referred to hereinafter, are to be gauged by the apparatus of this invention. The diaphragm 20 is centered with respect to the axis of the ring 25 and prevented from moving in a horizontal direction thereon by means of a continuous flange 31 surrounding the surface 28 and slightly spaced from the periphery of the diaphragm 20. A continuous annular groove 32 is formed in the upper surface of the ring 25 intermediate the surface 28 and the flange 31 for clearance purposes. The peripheral surface of the ring 25 is knurled, as shown fragmentarily in Fig. 4, for facilitating the rotation of the ring when gauging the parallelism of the surfaces of the diaphragm 20, which operation will be described hereinafter. The diaphragm 20 is formed with a central raised portion 33 upon which, adjacent its periphery, is provided an inner annular seating portion or surface 34 arranged upon the side of the diaphragm opposite to the seating surface 29 hereinbefore described, the surfaces 29 and 34 being coaxial. The surface 34 is one of the surfaces to be gauged with respect to the surface 29 by the apparatus of this invention and will be referred to hereinafter. In some instances the diaphragm 20 is made from thin ductile metal and in order to function properly in the sound transmitting instrument to which it is applied it is necessary that the seating portions or surfaces 29 and 34 which, as clearly shown in Fig. 4, are disposed concentrically and in different vertical planes, be parallel and predeterminedly spaced from each other.

The base member 21 (Fig. 4) is provided with a circular depression 35 which is aligned with the inner periphery of the ring 25. Fixed to the base 21 axially of the depression 35 and the ring 25 is a vertical post 36 upon which is slidably and rotatably carried a forming or adjusting member 37 normally resting at its lower end upon the bottom wall of the depression 35. An air vent 40 formed in the member 37 connects with an aperture 41 thereof, in which fits the post 36, the post not quite reaching the inner end of the aperture and disposed below the vent. This arrangement provides an escape for air which might be trapped between the member 37 and the upper end of the post 36 so that the member will freely move upon the post during the operation of the fixture 19, to be described hereinafter. Adjacent its lower end the member 37 upon its periphery is provided with an annular channel 42 (Fig. 4) into which extends at opposite sides thereof furcations 43 of a bifurcated lever 44 pivoted at 45 to the base member 21 within a slot 46 formed therein. At its outer end the lever 44 is provided with a handle portion 49 and it will be apparent, referring to Fig. 4, upon applying pressure thereto in a downward direction that the inner bifurcated end thereof will swing upwardly and raise the member 37. The upper end of the member 37 is provided with a continuous annular wall 50 flush with the periphery of the member and having a flat horizontal surface at its extreme end which engages a portion of the diaphragm 20 opposite the surface 34 thereof during one adjustment of the diaphragm. The downward movement of the lever 44 is limited by a lower shouldered corner 51 thereof coming into contact with the bottom wall of the slot 46, which also extends through a vertical post 52 attached to the left end of the base member 21 (Fig. 4), the purpose of which will be referred to hereinafter.

Pivoted at 53 upon the post 52, which is slotted at its upper end, is a lever or leaf 54 having pivoted at its free end, as shown at 55 (Figs. 3 and 5) a pivotal latch 56 provided with a handle portion 57 and a latching portion 58. The leaf 54 normally stands in a vertical position slightly inclined to the left, as shown in fragmentary dotted outline in Fig. 4, in which position cooperating surfaces 59 and 60 provided upon the post 52 and the inner end of the leaf, respectively, engage and hold it in this position. At the right end of the base member 21 opposite the vertical post 52 is a vertical post 63 (Figs. 3 and 5) provided with a slot 64 for receiving the latch 56 when the leaf 54 is swung downwardly to the right from its dotted outline position to the position shown in Figs. 3, 4 and 5, the latch portion 58 latching under a pin 65 carried by the post 63 and extending across the slot 64 thereof.

Threaded into an aperture formed in the leaf 54 between the pivot 53 and the latch 56 is a circular nut 66 with a comparatively large axial aperture 67 formed therein. The outer end of the nut 66 has a knurled peripheral portion 68 for the purpose of facilitating the turning of the nut when operating the fixture 19, to be described hereinafter. A continuous annular smooth rounded surface 69 is provided on the inner end of the nut 66 which engages a portion of the diaphragm 20 intermediate the surfaces 29 and 34 during one adjustment of the diaphragm. Upon the inner or lower surface of the leaf 54, as viewed in Fig. 4, and concentric with and surrounding the aperture provided in the leaf for the nut 66 is formed a continuous annular wall 70 having a flat end surface which is parallel to the surface 28 of the ring 25 when the leaf is in its latched position and opposite the surface 29 of the diaphragm 20 during one adjustment thereof. When the leaf 54 is in its latched position, as shown in Figs. 3 and 4, the axis of rotation of the nut 66 and the annular surface 69 at its inner end will be coincident with the vertical axis of the rotatable ring 25 supporting and centering the diaphragm 20, which as hereinbefore described is provided with the outer and inner coaxial oppositely disposed annular seating portions or surfaces 29 and 34.

Secured to the outer or upper surface of the leaf 54, when it is positioned horizontally for gauging a diaphragm 20, as viewed in Figs. 3 and 4, is an arm 71 provided with an elongated head 72 at its free end which extends freely into the aperture 67 of the nut 66. Mounted to freely slide in a suitable aperture formed in the head 72 is an elongated gauge member 73 provided with an annular shoulder adjacent its upper end and terminating thereabove in a pointed indicator portion 74, the shoulder serving to predeterminedly limit the movement of the gauge member 73 in one direction, while a movement thereof in the opposite direction is limited by a horizontal arm 75 secured to the head 72 and suitably spaced from the end of the indicator 74. The gauge member 73 is arranged in the head 72 so that the lower end thereof will engage the inner annular seating portion or surface 34 of the diaphragm 20 and intermediate the inner and outer peripheries thereof when the leaf 54 is swung from its dotted line position to its horizontal position (Fig. 4).

Also mounted to freely slide in the head 72 in a manner similar to that of the gauge member 73 only arranged therein to engage coaxially the central raised portion 33 of the diaphragm 20 is a shouldered pin 78 having a predetermined weight equivalent to the pressure exerted normally on the central portion 33 of the diaphragm when in use in a sound transmitting instrument which permits the gauging and adjusting of the diaphragm under conditions substantially the same as when it is in use. The movement of the pin 78 is limited in either direction in the head 72 by the shoulder of the pin and the arm 75.

In Fig. 2 is illustrated an elevational view of the screen 17 which has marked thereon a pair of parallel horizontal gauging lines 79 indicating tolerance limits for parallelism of and the space between the surfaces, the lines being suitably calibrated in accordance with the particular article and dimensions or other characteristics thereof to be gauged.

In gauging and adjusting the diaphragms 20 of the type hereinbefore described it will be understood that the fixture 19, as hereinbefore mentioned, is mounted on a common supporting member (not shown) with the elements of the optical system in a predetermined relation therewith. In this relation the vertical axis of the gauge member 73 is arranged at right angles to and intersects the horizontal axis of the beam of light passing from the condensing lenses 12 to the lenses 14 of the projector 13. With the leaf 54 of the gauging and adjusting fixture 19 in its normal raised position slightly inclined to the left as indicated in fragmentary dotted outline in Fig. 4 and correctly related to the optical system the lamp 11 of the latter is turned on and the beam of light passes between the lenses 12 and 14 and onto the screen 17.

A diaphragm 20 is then positioned on the surface 28 of the ring 25 and centered by the flange 31 with the central raised portion 33 thereof facing upwardly. Thereafter the leaf 54 is swung downwardly and latched into the position shown in Figs. 3 and 4 in the manner hereinbefore described, whereupon the lower end of the gauge member 73 will freely rest upon or engage the annular surface 34 of the diaphragm 20 and the lower end of the pin 78 will freely rest upon or engage coaxially the central portion 33 of the diaphragm. In this position of the gauge member 73 the indicator portion 74 thereof will extend into the path of the beam of light between the lenses 12 and 14, as clearly shown in Fig. 1, whereupon a magnified image 80 of the upper end of the gage indicator 74 will be projected onto the screen 17, as shown in Fig. 2. The operator then rotates the ring 25, at least a complete revolution, by grasping the knurled periphery thereof and if the image 80 of the gauge indicator 74 during the rotation of the diaphragm 20 moves vertically between the lines 79 of the screen 17 a lack of parallelism of the surfaces 29 and 34 of the diaphragm 20 is indicated, and if the movement is such that the image moves outside the lines 79, which are the tolerance limits, the particular diaphragm is considered defective, unless during further gauging and subsequent adjusting thereof, to be described shortly, its lack of parallelism should be corrected to a point which will bring it within the tolerance limits.

If the image 80 of the gauge indicator 74 stands still or moves only between the tolerance limits 79 during the rotation of the diaphragm 20 the surfaces 29 and 34 of the diaphragm are considered to be sufficiently parallel to permit the use of the diaphragm and at the same time it is also indicated that the space between the surfaces 29 and 34 is within the predetermined tolerance limits and, therefore, the diaphragm 20 is considered satisfactory with respect to this particular dimension between the mentioned surfaces and also as to their parallelism.

Should the image 80 of the indicator 74 lie below the lower limit line 79 downward pressure is applied by the operator to the handle portion 49 of the lever 44. The forming or adjusting member 37 is thus moved upwardly, bringing the upper flat surface of the annular wall 50 into engagement with the central portion 33 of the diaphragm 20 at a point opposite the surface 34, first moving the diaphragm bodily upwards until the surface thereof opposite to the surface 29 engages the flat end surface of the annular wall 70 of the leaf 54. The continuing upward movement of the member 37 raises the central portion 33 of the diaphragm 20 to a higher level, the peripheral portion of the diaphragm adjacent the surface 29 being held back by its engagement with the wall 70 and the material of the diaphragm will be manipulated or formed annularly around the inner edge of the wall 70. It is to be understood that at this time the nut 66 is at such a level in the leaf 54 which will prevent the diaphragm 20 from engaging with the annular surface 69 of the nut. Hand pressure is then removed from the handle portion 49 and the member 37 moves downwardly to its normal position and the position of the image 80 of the indicator 74 is again observed. If the image 80 is still below the lower limit line 79 the operation just described is repeated with a slightly increased pressure upon the handle portion 49 and if necessary again repeated until the image shows between the limit lines 79.

In case the image 80 of the indicator 74 lies above the upper limit 79 either in the first instance or during the forming operation first described, the adjustment of the diaphragm is made in the following manner: The operator grasps the nut 66 and turns it downwardly in the leaf 54 to engage the annular surface 69 of the nut with the portion of the diaphragm 20 intermediate the surfaces 39 and 34. A continued rotation of the nut 66 lowers the central portion 33 of the diaphragm 20, manipulating or forming it annularly around the inner edge of the surface 28 of the ring 25 upon which rests the surface 29 of the diaphragm. The nut 66 is then rotated in a reverse direction, drawing the annular surface 69 sufficiently away from the diaphragm so that it will not be influenced thereby and the image 80 of the indicator 74 is again observed. Should the image 80 still be above the upper limit line 79 the operation just described is repeated, the nut 66 being lowered a slightly greater distance, and if necessary again repeated until the image shows between the limit lines 79. This completes the gauging and adjusting of the diaphragm 20 upon the fixture 19 and thereafter the leaf 54 is unlatched by pulling upwardly upon the handle portion 57 of the pivotal latch 56 and the leaf is then raised to its substantially vertical position. To raise the diaphragm 20 from the ring 25 the lever 44 is operated by pressing downwardly upon the handle portion 49, the operator then removing the diaphragm while in its raised position.

Although the nut 66 has been described herein as means for manipulating or adjusting a diaphragm 20, it will be obvious that it may be used as a positioning or holding element for the part being gauged.

In Figs. 5, 6 and 7 there is shown another embodiment of this invention whereby the relative spaces and parallelism between three annular seating portions or surfaces disposed on one side of the diaphragm 20, comprising the previously described surface 34, a surface 83 opposite the previously described surface 29, and a surface 84 at the outer edge of the diaphragm may be gauged.

The apparatus disclosed in Figs. 5, 6 and 7 may be advantageously used as a separate cross or re-check of the efficiency of the gauging and adjusting apparatus previously described and also may serve to detect whether any deleterious deformation has been created in the surfaces 83 and 84 during the previous adjustment between the surfaces 29 and 34.

Referring particularly to Fig. 5 there is disclosed a fixture 85 substantially similar to the fixture 19, previously described, with the exception that it does not embody means for forming or adjusting the diaphragm 20 and includes two gauge members 86 and 87 in addition to the previously described gauge member 73, the gauge members 86 and 87 engaging the annular seating surfaces 83 and 84, respectively, of the diaphragm.

The upper ends of the gauge members, 73, 86 and 87 terminate in pointed indicator portions 90, 91 and 92, respectively, the indicator portions 90 and 92 being suitably offset from the gauge members 73 and 87 and toward the indicator portion 91 of the gauge member 86 in order that magnified images 93, 94 and 95 thereof (Fig. 7) upon the screen 17 may be observed in close relation. For the purpose of preventing angular displacement of the indicator portions 90 and 92 guiding pins 98, secured to the head 72 in which the gauge members 73, 86 and 87 are mounted to freely slide are associated with the offset portions of the indicator portions 90 and 92.

In the use of the fixture 85 in association with the elements of the optical system, previously described, a diaphragm 20 is positioned on the rotatable ring 25 and the leaf 54 is swung downwardly and latched in a manner similar to that described in connection with the fixture 19. The lower ends of the gauge members 73, 86 and 87 will then freely rest upon or engage the annular seating surfaces 34, 83 and 84, respectively, of the diaphragm, the pin 78 also will freely rest upon or engage coaxially the central portion 33 of the diaphragm. With the gauge members 73, 86 and 87 in this position the indicator portions 90, 91 and 92, respectively, will extend into the path of the beam of light and thus the magnified images 93, 94 and 95, respectively, will appear upon the screen 17 as shown in Fig. 7. The screen 17 has marked thereon an individual pair of parallel horizontal gauging lines 99 for each indicator image, indicating tolerance limits for parallelism of and the space between the surfaces 34, 83 and 84. If during a complete revolution of the ring 25 each of the images 93, 94 and 95 stays between its tolerance limits the diaphragm is considered satisfactory with respect to the particular tolerance limits between the surfaces 34, 83 and 84, and also as to their parallelism. In case both of the images 94 and 95 lie between their respective tolerance limits and the image 93 lies above or below its tolerance limits, either before or during the rotating of the ring 25, it is possible that the particular diaphragm 20 may be adjusted in the manner hereinbefore described, by means of the fixture 19. If either of the images 94 and 95 lies above or below its respective tolerance limits the particular diaphragm is considered defective.

From the foregoing description it will be apparent that means is provided for accurately gauging and adjusting diaphragms of the described type to predetermined dimensions in a facile manner.

Although the invention as herein illustrated and described is particularly well adapted for use in connection with the gauging and adjusting of a particular type of diaphragm for use in sound transmitting instruments, it should be understood that the novel features thereof are capable of being applied to the gauging and adjusting of other types of diaphragms, as well as that of other articles or other applications and should be limited only by the scope of the appended claims.

What is claimed is:

1. A gauge comprising rotatable means for supporting an article to be gauged, an elongated gauge member slidably mounted in position for one end therof to engage the article to be gauged at a point spaced from the center of rotation, and an element having a predetermined weight slidably mounted and arranged to axially engage the article for exerting a predetermined pressure thereagainst during gauging.

2. A gauge comprising means for supporting an article to be gauged, an elongated gauge member slidably mounted in position for one end thereof to engage the article to be gauged at a point spaced from its center, and an element having a predetermined weight slidably mounted and arranged to engage the article coincident with its center for exerting a predetermined pressure thereagainst during gauging.

3. A gauge comprising a frame, means mounted thereon for supporting an article to be gauged, a member hinged to the frame, an elongated gauge member slidably mounted in the member in position for one end thereof to engage the article to be gauged at a point spaced from its center, and an element having a predetermined weight slidably mounted in the hinged member and arranged to engage the article coincident with its center for exerting a predetermined pressure thereagainst during gauging, the gauge member and the element engaging the article substantially in unison when the hinged member is in one position.

4. In an apparatus for gauging the space between concentric surfaces of an article disposed in different planes, means for indicating calibrated tolerance limits for the space to be gauged, a frame associated therewith having a seating portion with which one surface of the article is engaged for predeterminedly locating it with respect to the tolerance limits, a member hinged to the frame, an elongated gauge member slidably mounted in the member in position for one end thereof to engage the other surface of the article at a point spaced from its center when the hinged member is in one position and having its other end spaced therefrom and in position for comparison with the tolerance limits, and an element slidably mounted and arranged to engage the article at a point centered with respect to the concentric surfaces for exerting a predetermined pressure thereagainst during gauging.

5. In an apparatus for gauging a diaphragm, a support, a seat thereon for the diaphragm, a member hinged to said support carrying an adjustable annular member for engaging the diaphragm in one position, an arm carried by said hinged member and extending into said annular member, and a gauging element carried by the extension of said arm.

6. In an apparatus for gauging an article, a support, a seat thereon for the article, an apertured member hinged to said support, an arm carried by said member and extending into the aperture thereof, and a gauging element carried by the extension of said arm, said gauging element being slidable in an aperture in the extension of said arm.

7. In an apparatus for gauging a plurality of concentric plane surfaces of a disc-shaped article, a support for the article, and a plurality of gauge members slidably mounted in spaced relationship and arranged perpendicular to the plane surfaces to be gauged for one end of each of the gauge members to engage the respective plane surface of the article to be gauged, the opposite ends of the gauge members being provided with indicator portions, and the indicator portions of certain of the gauge members being offset relative to the article engaging ends thereof and arranged in close relationship for observation.

8. In an apparatus for gauging a disk-shaped article, a support, a seat thereon for the article, a member hinged to said support having an annular portion adapted in one position to lie over the periphery of the article, an arm carried by said hinged member and having an extension extending into the space within said annular portion, and a gauging element carried by said extension, said gauging element being mounted for movement substantially perpendicular to the surface of said article.

9. In an apparatus for gauging an article, a support, a seat rotatable thereon for the article, a member hinged to the support carrying an adjustable annular member for engaging the article in one position, an arm carried by said hinged member and extending into said annular member, and a gauging element carried by the extension of said arm.

ARTHUR W. SCHOOF.